(12) United States Patent
Pellen

(10) Patent No.: US 7,882,703 B2
(45) Date of Patent: Feb. 8, 2011

(54) SYSTEM AND METHOD FOR DEPLOYMENT OF A COLD WATER PIPE

(75) Inventor: Alain T. Pellen, Boca Raton, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 385 days.

(21) Appl. No.: 12/247,445

(22) Filed: Oct. 8, 2008

(65) Prior Publication Data

US 2010/0086365 A1    Apr. 8, 2010

(51) Int. Cl.
| | |
|---|---|
| F03G 7/04 | (2006.01) |
| F03G 7/06 | (2006.01) |
| E02D 23/00 | (2006.01) |
| E02D 27/24 | (2006.01) |
| E02D 29/00 | (2006.01) |
| E21B 17/01 | (2006.01) |
| B63B 35/44 | (2006.01) |

(52) U.S. Cl. .................. 60/641.7; 405/195.1; 114/264; 60/641.1; 60/641.6

(58) Field of Classification Search .................. 60/398, 60/641.1, 641.6, 641.7; 114/264–266; 405/195.1–228
See application file for complete search history.

(56) References Cited

U.S. PATENT DOCUMENTS

| | | | |
|---|---|---|---|
| 2,006,985 A | 7/1935 | Claude et al. | |
| 4,014,279 A | 3/1977 | Pearson | |
| 4,030,301 A | 6/1977 | Anderson | |
| 4,050,252 A | 9/1977 | Nakanishi | |
| 4,087,975 A | 5/1978 | Owens | |
| 4,116,009 A | 9/1978 | Daubin | |
| 4,176,863 A | 12/1979 | Wetmore | |
| 4,208,290 A | 6/1980 | Wetmore et al. | |
| 4,212,329 A * | 7/1980 | Horton ....................... | 138/155 |
| 4,221,504 A | 9/1980 | Person et al. | |
| 4,231,312 A | 11/1980 | Person | |
| 4,234,269 A | 11/1980 | Person et al. | |
| 4,245,475 A | 1/1981 | Girden | |
| 4,273,068 A | 6/1981 | McNary | |
| 4,281,614 A | 8/1981 | McNary et al. | |
| 4,293,239 A * | 10/1981 | Petty et al. .................. | 405/203 |
| 4,294,564 A | 10/1981 | Person et al. | |
| 4,302,682 A | 11/1981 | LaCoste | |
| 4,311,012 A * | 1/1982 | Finley ....................... | 60/641.7 |
| 4,350,014 A * | 9/1982 | Sanchez et al. ............. | 60/641.7 |
| 4,358,225 A * | 11/1982 | van der Pot et al. ......... | 405/303 |
| 4,497,342 A * | 2/1985 | Wenzel et al. .......... | 137/565.17 |
| 4,603,553 A | 8/1986 | Ridgway | |
| 4,703,626 A | 11/1987 | Jensen | |
| 5,024,557 A * | 6/1991 | Iorns .......................... | 405/223 |
| 5,513,494 A | 5/1996 | Flynn et al. | |

(Continued)

Primary Examiner—Thomas E Denion
Assistant Examiner—Christopher Jetton
(74) Attorney, Agent, or Firm—Fogg & Powers LLC

(57) ABSTRACT

A cold water pumping system comprises a center tube and a cold water pipe surrounding the center tube. The cold water pipe is supported from a bottom end of the center tube and an impeller is coupled to the bottom end of the center tube. The impeller is operable to move water through the cold water pipe, wherein the cold water pipe is comprised of a plurality of segments. Each segment of the cold water pipe comprises at least two frame sections configured to be coupled together to surround the center tube and a removable skin configured to be inserted throughout the perimeter of the at least two sections.

20 Claims, 5 Drawing Sheets

U.S. PATENT DOCUMENTS

| | | | |
|---|---|---|---|
| 5,555,838 A * | 9/1996 | Bergman | 114/265 |
| 5,582,691 A | 12/1996 | Flynn et al. | |
| 7,178,337 B2 | 2/2007 | Pflanz | |
| 7,328,578 B1 | 2/2008 | Saucedo | |
| 2007/0289303 A1 | 12/2007 | Prueitt | |

* cited by examiner

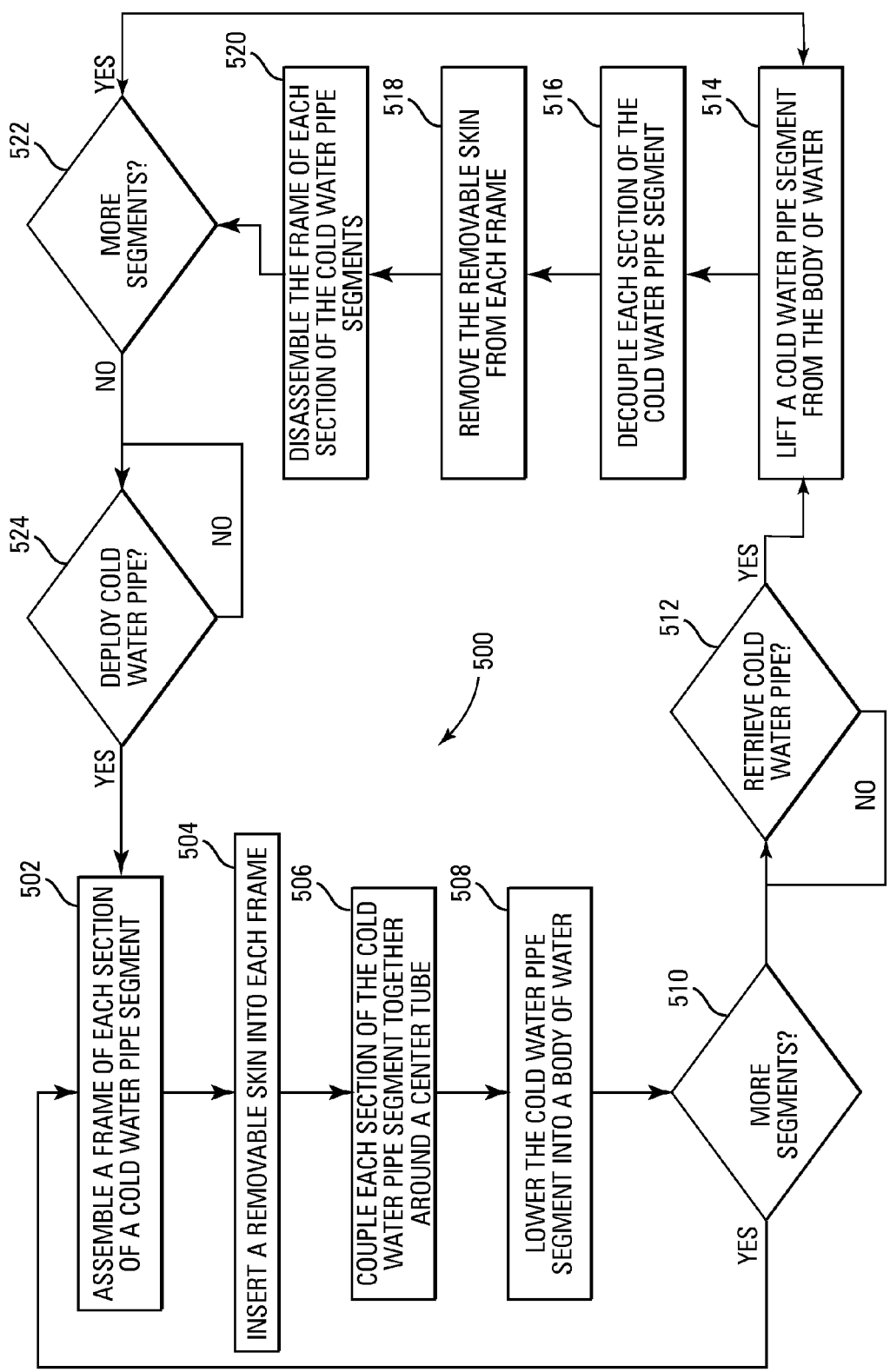

SYSTEM AND METHOD FOR DEPLOYMENT OF A COLD WATER PIPE

BACKGROUND

Ocean Thermal Energy Conversion (OTEC) systems are used to generate electricity based on the temperature difference between deep and shallow water. The efficiency of an OTEC system is dependent on the size of the temperature difference. For this reason, typical OTEC systems deploy large cold water pipes to depths around 1000 meters in order to provide a greater difference in temperature between the sun-heated surface water and the deep cold water which is pumped to the surface.

Deployment of cold water pipes typically requires the use of an offshore work boat, a crane barge or an underwater remotely operated vehicle. This external assistance is very expensive. In addition, typical cold water pipes require significant amounts of time to deploy and retrieve if necessary, such as for maintenance. This not only increases the cost of operation due to the extended shut down time, but can also place the OTEC system in danger. For example, in addition to being retrieved for maintenance, a cold water pipe also needs to be retrieved when there is a threat of severe weather, such as a hurricane. If the cold water pipe is not retrieved in time, the OTEC system can be damaged by an incoming hurricane.

For the reasons stated above and for other reasons stated below which will become apparent to those skilled in the art upon reading and understanding the present specification, there is a need in the art for an improved system and method of deploying a cold water pipe.

SUMMARY

The above mentioned problems and other problems are resolved by the embodiments described herein and will be understood by reading and studying the following specification.

In one embodiment a cold water pumping system is provided. The cold water pumping system comprises a center tube and a cold water pipe surrounding the center tube. The cold water pipe is supported from a bottom end of the center tube and an impeller is coupled to the bottom end of the center tube. The impeller is operable to move water through the cold water pipe, wherein the cold water pipe is comprised of a plurality of segments. Each segment of the cold water pipe comprises at least two frame sections configured to be coupled together to surround the center tube and a removable skin configured to be inserted throughout the perimeter of the at least two sections.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 5 is a flow chart depicting one embodiment of a method of deploying/retrieving a cold water pipe.

In accordance with common practice, the various described features are not drawn to scale but are drawn to emphasize specific features relevant to the exemplary embodiments described herein. Like reference numbers and designations in the various drawings indicate like elements.

DETAILED DESCRIPTION

Figure 1:
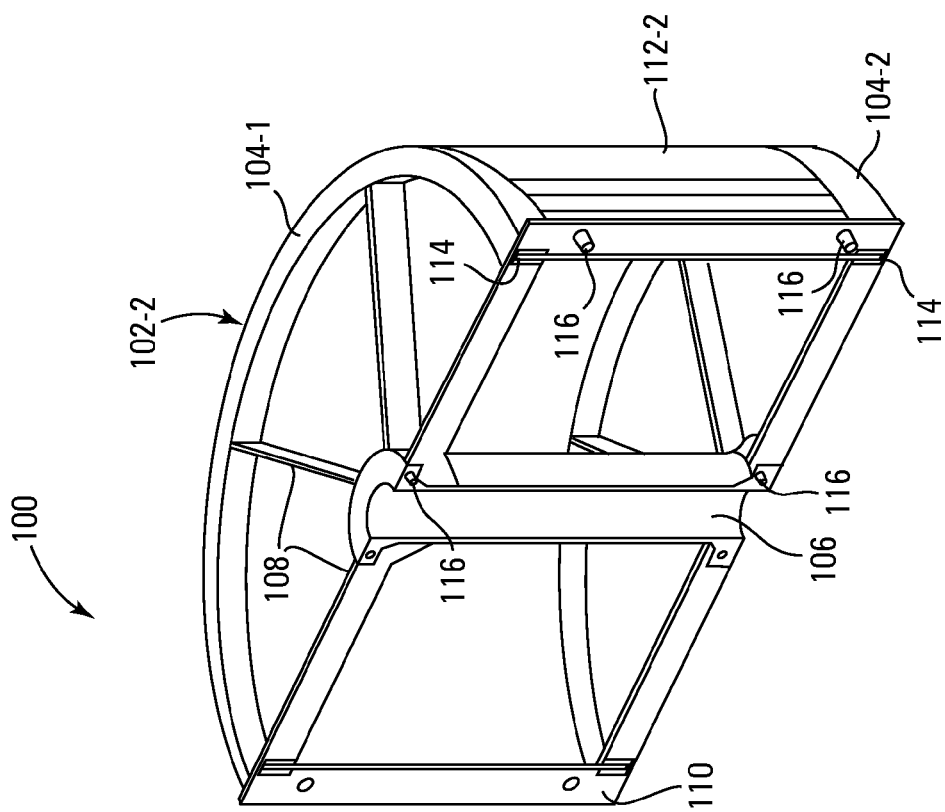
FIG. 1 is an exploded view of one embodiment of a cold water pipe segment.
Figure 1:
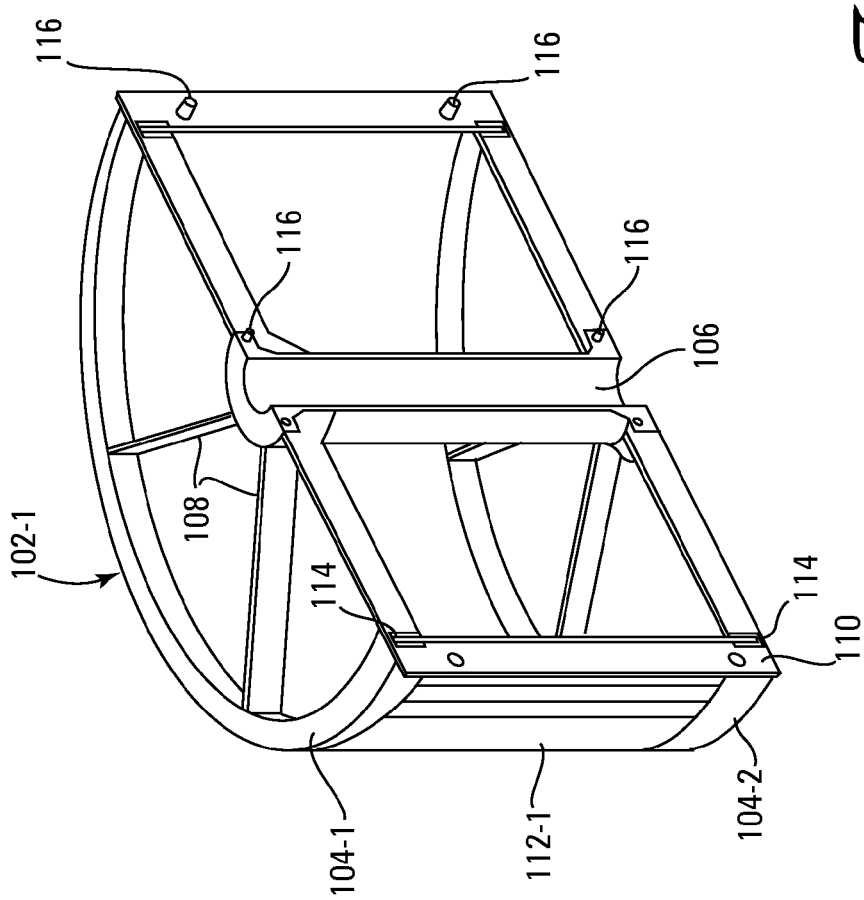

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

FIG. 1 is a diagram depicting one embodiment of a cold water pipe segment 100. Cold water pipe segment 100 is comprised, in this embodiment, of two substantially identical frame half-sections 102-1 and 102-2. However, it is to be understood that, in other embodiments, more than two sections can be used. For example, each segment can be comprised of three tri-sections or four quarter-sections, in other embodiments. Each frame half-section 102 includes two arcs 104-1 and 104-2; core 106, rails 108, and bars 110. Arcs 104 are coupled to core 106 via rails 108. Although four rails 108 are shown in this embodiment, it is to be understood that any appropriate number of rails 108 can be used in other embodiments. Additionally, arc 104-1 is coupled to arc 104-2 via bars 110. Each of arcs 104-1 and 104-2 also includes a slot 114 into which a removable skin 112 is inserted. Removable skin 112 is a flexible light-weight material which is substantially impervious to flowing water, such as a thin fiberglass or thin plastic. Similarly, arcs 104, rails 108, and bars 110 are each made of a fiber-glass material in this embodiment. However, it is to be understood that other materials, such as steel or titanium, can be used in other embodiments.

Figure 2:
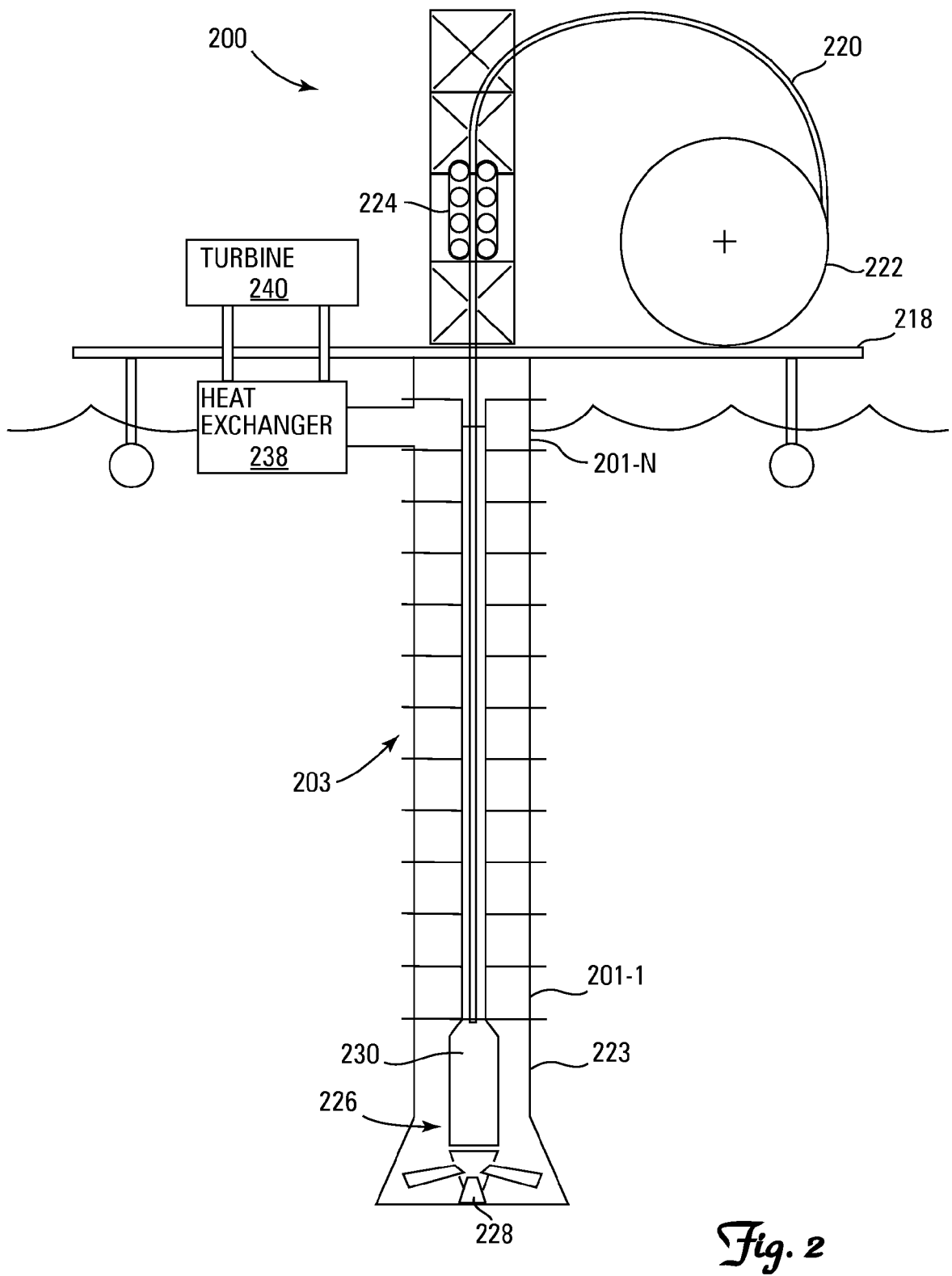
FIG. 2 is a diagram of one embodiment of a cold water pumping system.
Figure 3:
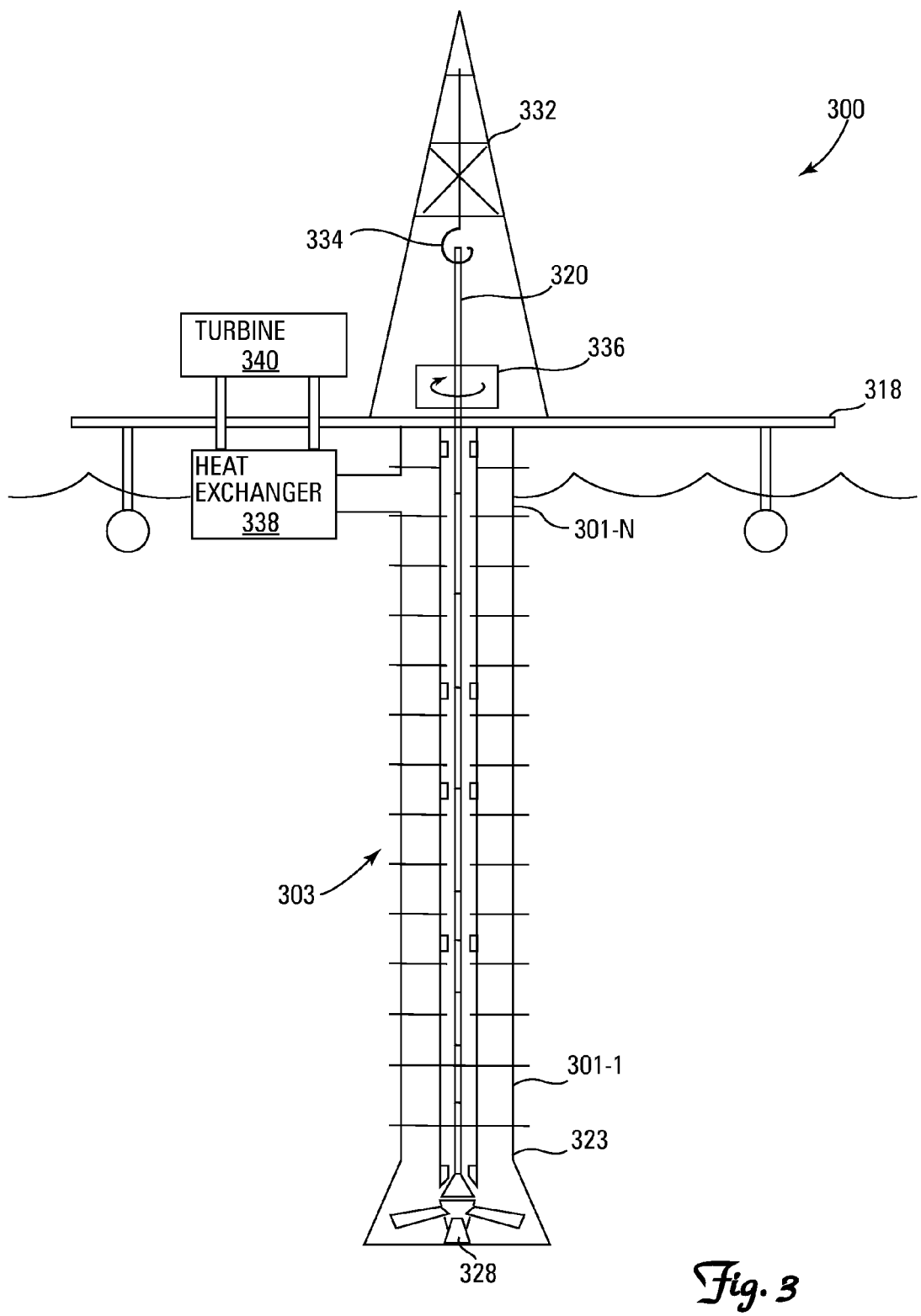
FIG. 3 is a diagram of an alternative embodiment of a cold water pumping system.

When not in use, cold water pipe segment 100 can be disassembled for storage in a compact fashion. In particular, removable skin 112 is removed from slot 114. In addition, core 106, rails 108, bars 110 and arcs 104 are separated for storage, in this embodiment. When cold water pipe segment 100 is to be used, each half section 102-1 and 102-2 is assembled. In particular, arcs 104 are coupled to each other via bars 110 and to core 106 via rails 108. Once assembled, a removable skin 112 is inserted throughout the perimeter of half sections 102-1 and 102-2. The frame half-sections are then coupled to coaxially surround a center tube as shown in FIGS. 2 and 3. In particular, each of core 106, and arcs 104 are coupled to corresponding arcs 104 and core 106 in the other frame half-section. In this embodiment, guide pins 116 are used in conjunction with bolts to couple half sections 102-1 and 102-2 together. However, in other embodiments, other securing means which are substantially vibration resistant can be used, such as quarter-turn twist-locks.

The structure of removable skin 112 permits removable skin 112 to be removed from slot 114 as well as extended throughout the perimeter of arcs 104-1 and 104-2 in slot 114. For example, in some embodiments, removable skin 112 has an accordion or shutter-like structure. The accordion-like structure enables the removable skin 112 to be folded when in storage and unfolded for insertion into the perimeter of arcs 104-2 and 104-2. In other embodiments, removable skin 112 has a smooth flat structure enabling it to be rolled and unrolled. In addition, in this embodiment, removable skin 112 is comprised of two separate sections 112-1 and 112-2, one used for each frame half-section 102. However, in other embodiments, one removable skin 112 is used. In such an embodiment, removable skin 112 slides through slots 114 in both of half sections 102-1 and 102-2. At the seam where half sections 102-1 and 102-2 meet, an end of removable skin 112 in one of frame half-sections 102 overlaps an end of a removable skin 112 in the other frame half-section 102, in the embodiment shown in FIG. 1.

When assembled, cold water pipe segment 100 has a diameter of approximately 10 meters in this embodiment. However, it is to be understood that the diameter of cold water pipe segment 100, in other embodiments, can be larger or smaller. For example, in one other embodiment, the diameter is approximately 5 meters. Additionally, cold water pipe segment 100 is 3 meters high in this embodiment. Although, other heights and dimensions can be used in other embodiments. In operation, multiple cold water pipe segments are stacked on top of one another to form a cold water pipe as described below and shown in FIGS. 2 and 3.

FIG. 2 is a diagram depicting one embodiment of a cold water pumping system 200. In this embodiment cold water pumping system is implemented as an Ocean Thermal Energy Conversion (OTEC) power plant which includes cold water pipe 203, heat exchanger 238, and turbine 240. In the embodiment shown in FIG. 2, cold water pumping system 200 is located on a floating platform 218. However, it is to be understood that cold water pumping system 200 can also be used in land-based OTEC plants in other embodiments.

Cold water pipe 203 comprises a plurality of cold water pipe segments 201-1 . . . 201-N. The total number of cold water pipe segments 201 is dependent on the depth desired for cold water pumping system 100 to reach. Each segment 201 is stored disassembled as discussed above. As cold water pipe segments 201 are used, they are assembled in frame half-sections and then coupled to coaxially surround center tube 220, as described above. In particular, a core (e.g. core 106) of each segment 201 surrounds center tube 220. However, the core is not attached or coupled to center tube 220 directly. Rather, the weight of each segment 201 is born by the segments beneath them. Ultimately, the weight of all the segments 201 is carried by tube 220 from the bottom of the cold water pipe 203. In particular, the first segment 201-1 is placed on flange 223 which is coupled to center tube 220 such that the weight of all the segments 201 is carried to center tube 220 through flange 223.

At the bottom of the cold water pipe 203 is a pump 226 operable to pump cold water through cold water pipe 203 to warmer water near the surface of the body of water. In particular, pump 226 includes an impeller 228 and a motor 230 at the bottom of cold water pipe 203. Electricity is supplied to pump 226 via an electrical cable located inside center tube 220. In addition, center tube 220 is implemented as coiled tubing, in this embodiment. Center tube 220 is comprised of steel and has a diameter of about 4 inches in this embodiment. However, it is to be understood that other materials and diameters can be used in other embodiments. As center tube 220 is uncoiled from drum 222, cold water pipe segments 201 are assembled around center tube 220, as described above. After each segment 201 is assembled, another portion of center tube 220 is uncoiled lowering the segment into the water and providing space for assembling another segment. In addition, as center tube 220 is uncoiled, a tensioner/straightener 224 straightens and puts tube 220 into tension. Hence, tensioner/straightener 224 increases the stiffness of center tube 220 which acts as a spine of cold water pumping system 200.

If there is a need to retrieve cold water pipe 203 from the water, such as for maintenance or a hurricane threat, center tube 220 is coiled to bring one of segments 201 to the surface where it is disassembled, as discussed above. In particular, a skin (e.g. removable skin 112) is removed from the perimeter of the segment. Sections of the segment are then decoupled from each other and then each section is disassembled. Center tube 220 is then coiled further to bring another one of segments 201 to the surface for disassembly. This pattern continues until cold water pipe 203 has been retrieved from the water.

The structure of cold water pipe 203 enables a relatively quick and easy removal of cold water pumping system 200 from the water as compared to conventional removal techniques. For example, cold water pipe 203 enables removal of cold water pumping system 200 without the need for expensive offshore workboats with heavy lift crane capabilities. Similarly, cold water pipe 203 eliminates the need for remotely operated vehicles. Furthermore, the relative quick deployment and removal of cold water pumping system 200 (about 3 days in some embodiments depending on the depth of the cold water pumping system) also reduces cost due to the shorter shut down times.

In operation, cold water pumping system 200 pumps cold water to heat exchanger 238 where a working fluid, such as ammonia or water, is converted between gas and liquid states. When in the gas state, the working fluid causes turbine 240 to rotate and, thereby, generate electricity. An exemplary heat exchanger is described in more detail in FIG. 4 below.

FIG. 3 is a diagram depicting one embodiment of an alternative cold water pumping system 300. As with cold water pumping system 200 described above, cold water pumping system 300 also includes a cold water pipe 303 comprised of a plurality of cold water pipe segments 301-1 . . . 301-N, such as cold water pipe segment 100 described above. However, center tube 320 is implemented as a plurality of drill pipe sections in the embodiment shown in FIG. 3. The length of each drill pipe section can vary between about 25 to 50 feet. As cold water pumping system 300 is deployed into the water, each cold water pipe segment 301 is assembled around a section of drill pipe 320 and then lowered toward the water with the weight of the cold water pipe 303 being supported at the bottom of cold water pumping system 300 as in cold water pumping system 200 above. Upon reaching an end of a section of drill pipe 320, another section of drill pipe 320 is added. The cold water pumping system 300 is lowered toward the water by a crane 332 and lifting hook 334 attached to drill pipe 320 and located on platform 318. A similar process occurs in the reverse direction for removal of cold water pumping system 300 from the water. In particular, a section of drill pipe 320 is lifted by crane 332 to bring a segment 301 of cold water pipe 303 to the surface. The segment is disassembled, as discussed above. After the segment is disassembled, the drill pipe section is lifted further to bring another segment 301 to the surface for disassembly. Once the end of the drill pipe section is reached, the section is separated from the drill pipe 320 and another section is lifted by crane 332 and lifting hook 334. This process continues until the cold water pipe 303 has been retrieved from the water.

In addition, cold water pumping system 300 includes a rotary table 336 located on the floating platform 318. Rotary table 336 is coupled to an impeller 328 located at the bottom of the cold water pumping system 300 via drill pipe 320 and rotates impeller 328 via rotation of drill pipe 320. For example, in some embodiments, rotary table 336 rotates impeller 328 at 300 revolutions per minute (rpm). Due to the structure of cold water pipe segments 301, cold water pumping system can be deployed into and retrieved from the water relatively quickly and easily as discussed above.

In operation, cold water pumping system 300 pumps cold water to heat exchanger 338 where a working fluid, such as ammonia or water, is converted between gas and liquid states. When in the gas state, the working fluid causes turbine 340 to rotate and, thereby, generate electricity. An exemplary heat exchanger is described in more detail in FIG. 4 below.

Figure 4:
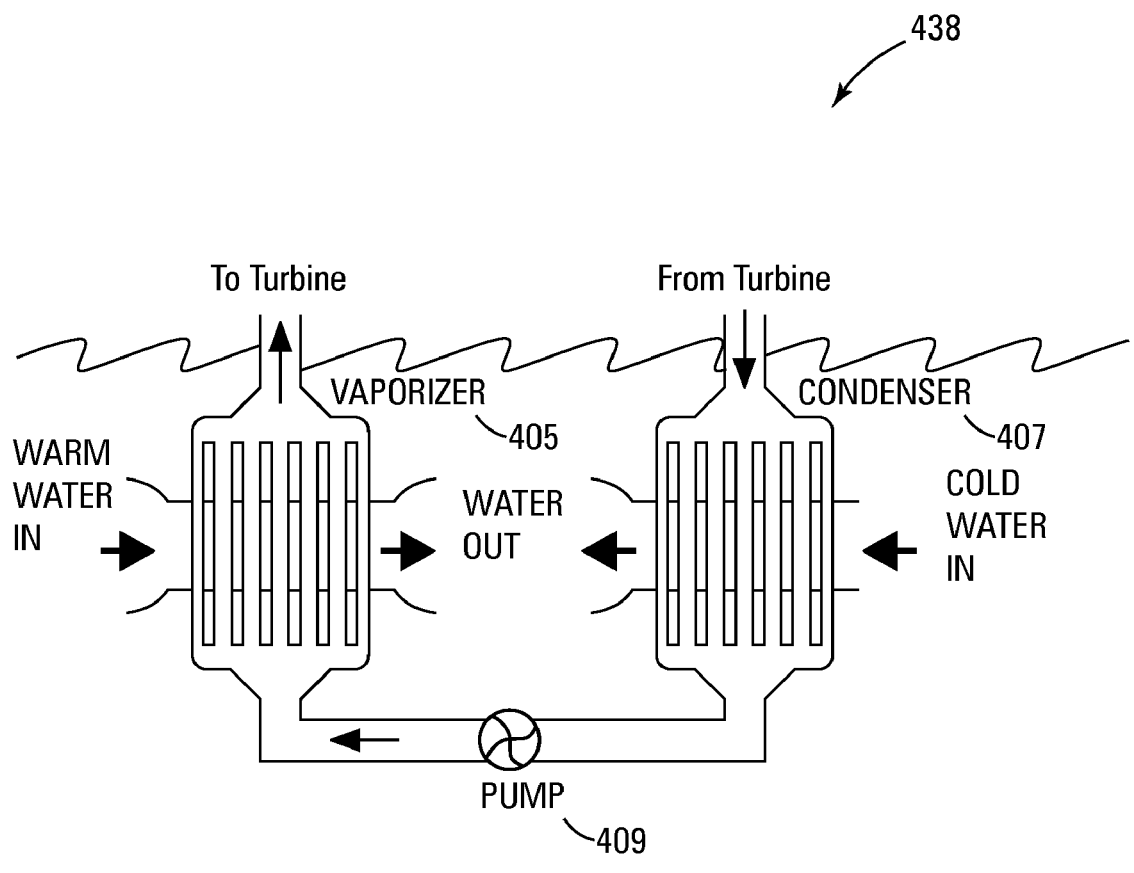
FIG. 4 is a diagram of an OTEC power plant seawater piping system.

FIG. 4 is a block diagram of an exemplary heat exchanger 438. Heat exchanger 438 is comprised of a vaporizer 405, a condenser 407, and a pump 409. A working fluid, such as ammonia, is located in heat exchanger 438. Cold water is pumped from a cold water pipe to come into contact with condenser 407. Since the cold water has a lower temperature than the working fluid, heat from the working fluid is passed to the cold water which causes the working fluid to convert from a gas state to a liquid state in condenser 407. Pump 409 then pumps the liquid to vaporizer 405 where heat from warmer surface water is transferred to the working fluid causing the liquid to convert to a gas state. While in the gas state, the working fluid is passed to a turbine, causing the turbine to rotate and generate electricity. The gas is then passed to the condenser where it is converted back to a liquid state. Notably, a heat exchanger for use in a closed-cycle OTEC has been described with respect to FIG. 4. However, it is to be understood that, in other embodiments, an open-cycle or hybrid OTEC can be used.

FIG. 5 is a flow chart of one embodiment of a method 500 of deploying/retrieving a cold water pumping system from a body of water. Method 500 can be implemented with a cold water pumping system such as systems 200 and 300 described above. At 502, the frame of each section of a cold water pipe segment is assembled. In particular, the rails, arcs, bars, and core, as described above, are assembled together and form the frame of each section. In this example, each segment is comprised of two sections. However, in other embodiments, more sections can be used for each segment. At 504, a removable skin is inserted into the frame. For example, as described above in one embodiment, the removable skin is slid into a slot in the arcs of each section. In some embodiments, a separate removable skin is used for each section. In other embodiments, one removable skin is used which covers the perimeter of all the sections when coupled together.

At 506, the frame sections are coupled together around a center tube, as described above, to form the complete cold water pipe segment. The sections are not coupled directly to the center tube such that the weight of the segment is born by the center tube at the bottom of the cold water pipe. At 508, the assembled cold water pipe segment is lowered toward a body of water. In some embodiments, the center tube is a coiled tubing and lowering the segment toward the water includes uncoiling the coiled tubing from a drum. In addition, in some such embodiments, uncoiling the coiled tubing includes straightening the coiled tubing as described above. It is then determined, at 510, if there are more segments to add to the cold water pipe. If there are more segments, method 500 returns to 502 where the frame of each section of another cold water segment is assembled. The subsequent segment is coupled to the previous segment before it is lowered toward the body of water.

If there are no more segments, method 500 continues at 512 where it is determined if there is a need to retrieve the cold water pipe. Exemplary needs include, but are not limited to, a potential hurricane and maintenance. If there is no need to retrieve the cold water pipe, method 500 loops at 512 until a need is identified. Once a need to retrieve the cold water pipe is identified at 512, method 500 continues at 514 where a cold water pipe segment is lifted out of the water. In some embodiments, the cold water pipe segment is lifted out of the water by coiling the center tube on a drum. At 516, the sections of the cold water pipe segment are decoupled from one another. At 518, the removable skin is removed from each section. The frame of each section is then disassembled at 520. Hence, the cold water pipe segment can be removed relatively easily and stored effectively as discussed above. At 522, it is determined if there are additional segments to be removed. If there are additional segments, method 500 returns to 514 where the next segment is lifted out of the water. If there are no additional segments, it is determined at 524, if the cold water pipe is to be deployed again in the water. If it is not to be deployed, method 500 loops at 524 until it is determined that the cold water pipe is to be deployed. Once it is determined that the cold water pipe is to be deployed, method 500 returns to 502.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the embodiments described herein. Therefore, it is manifestly intended that this invention be limited only by the claims and the equivalents thereof.

What is claimed is:

1. A cold water pumping system comprising:
a center tube;
a cold water pipe surrounding the center tube, the cold water pipe being supported from a bottom end of the center tube; and
an impeller coupled to the bottom end of the center tube and operable to move water through the cold water pipe;
wherein the cold water pipe is comprised of a plurality of segments, each segment comprising:
at least two frame sections configured to be coupled together to surround the center tube; and
a removable skin configured to be inserted throughout the perimeter of the at least two sections.

2. The cold water pumping system of claim 1, wherein the center tube is comprised of a plurality of drill pipe sections.

3. The cold water pumping system of claim 2, further comprising a rotary table coupled to one of the plurality of drill pipe sections and configured to rotate the impeller via the plurality of drill pipe sections.

4. The cold water pumping system of claim 1, wherein the center tube is comprised of a coiled tubing.

5. The cold water pumping system of claim 4, further comprising a motor coupled to the impeller and located at the bottom end of the center tube.

6. The cold water pumping system of claim 5, further comprising an electrical cable located in the center of the coiled tubing and configured to provide electricity to the motor.

7. The cold water pumping system of claim 4, further comprising a tensioner operable to straighten and support the coiled tubing.

8. The cold water pumping system of claim 1, wherein the removable skin is comprised of fiberglass.

9. The cold water pumping system of claim 1, wherein the removable skin is comprised of at least two sections, each section of the removable skin corresponding to one of the at least two frame sections.

10. The cold water pumping system of claim 1, further comprising:
- a heat exchanger coupled to the cold water pipe, wherein the heat exchanger is operable to cause a working fluid to convert from a gas to a liquid state due to heat transferred from cold water from the cold water pipe; and
- a turbine coupled to the heat exchanger, wherein the working fluid in the heat exchanger causes the turbine to rotate when in the gas state.

11. The cold water pumping system of claim 1, wherein each of the at least two frame sections comprises:
- a first arc having a slot throughout the perimeter of the first arc;
- a second arc having a slot throughout the perimeter of the second arc;
- a core;
- a plurality of rails, each of the plurality of rails configured to be coupled to the core and one of the first arc and the second arc; and
- two bars, each of the bars configured to be coupled to the first arc and the second arc.

12. A cold water pipe segment comprising:
- at least two frame sections, each of the at least two frame section comprising:
  - a first arc having a slot throughout the perimeter of the first arc;
  - a second arc having a slot throughout the perimeter of the second arc;
  - a core;
  - a plurality of rails, each of the plurality of rails configured to be coupled to the core and one of the first arc and the second arc; and
  - two bars, each of the two bars configured to be coupled to the first arc and the second arc; and
- a removable skin configured to be inserted in the slot of the first arc and the slot of the second art.

13. The cold water pipe segment of claim 12, wherein the removable skin is comprised of fiberglass.

14. The cold water pipe segment of claim 12, wherein the removable skin is comprised of at least two sections, each section of the removable skin corresponding to one of the at least two frame sections.

15. The cold water pipe segment of claim 12, wherein the removable skin is configured with an accordion-like structure.

16. A method of deploying/retrieving a cold water pumping system, the method comprising:
- assembling a frame of each section of a cold water pipe segment;
- inserting a removable skin into the frame of each section;
- coupling the frame sections together around a center tube; and
- lowering the cold water pipe segment toward a body of water.

17. The method of claim 16 wherein:
- coupling the frame sections together around a center tube comprises coupling the frame sections together around a coiled tubing; and
- lowering the cold water pipe segment toward the body of water includes uncoiling the coiled tube from a drum.

18. The method of claim 17, wherein uncoiling the coiled tube from the drum includes straightening the coiled tubing.

19. The method of claim 16 wherein:
- coupling the frame sections together around a center tube comprises coupling the frame sections together around a section of a drill pipe; and
- lowering the cold water pipe segment toward the body of water includes lowering the drill pipe with a crane.

20. The method of claim 16, further comprising:
- lifting the cold water pipe segment from the body of water;
- decoupling the frame sections from each other;
- removing the removable skin from each of the frame sections; and
- disassembling the frame of each section of the cold water pipe segment.

* * * * *